(12) United States Patent
Yamada et al.

(10) Patent No.: US 8,648,275 B2
(45) Date of Patent: Feb. 11, 2014

(54) POWER SUPPLY DEVICE FOR SINKER ELECTRIC DISCHARGE MACHINING

(75) Inventors: Kuniharu Yamada, Fukui (JP); Tomoyuki Yanagisawa, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 381 days.

(21) Appl. No.: 13/128,597

(22) PCT Filed: Feb. 26, 2010

(86) PCT No.: PCT/JP2010/053035
§ 371 (c)(1),
(2), (4) Date: May 10, 2011

(87) PCT Pub. No.: WO2010/098424
PCT Pub. Date: Sep. 2, 2010

(65) Prior Publication Data
US 2011/0220615 A1 Sep. 15, 2011

(30) Foreign Application Priority Data
Feb. 27, 2009 (JP) ................................ 2009-046989

(51) Int. Cl.
*B23H 1/02* (2006.01)
(52) U.S. Cl.
CPC ............ *B23H 1/022* (2013.01); *B23H 2300/20* (2013.01)
USPC ..................... 219/69.13; 219/69.18
(58) Field of Classification Search
USPC ..................... 219/69, 13, 69.18; 323/282, 287
See application file for complete search history.

(56) References Cited

U.S. PATENT DOCUMENTS 3,832,510 A * 8/1974 Pfau et al. .................. 219/69.13
4,602,142 A * 7/1986 Itoh ............................. 219/69.13
(Continued)

FOREIGN PATENT DOCUMENTS

DE 4125742 2/1993
EP 1234630 8/2002
(Continued)

OTHER PUBLICATIONS

Machine translation of Japan Patent document No. 2003-181,724, Jul. 2013.*

(Continued)

*Primary Examiner* — Geoffrey S Evans
(74) *Attorney, Agent, or Firm* — J.C. Patents

(57) ABSTRACT

A power supply device comprises a DC power supply (12), a current sensor (14) for detecting gap current (Igap) flowing through the machining gap, a first switching element (16) connected in series between the DC power supply and the tool electrode (2), a first reverse current prevention diode (22) connected in parallel with the DC power supply and connected in series with the first switching element (16), a second switching element (18) connected in series between the DC power supply and the workpiece (3), a second reverse current prevention diode (24) connected in parallel with the DC power supply and connected in series with the second switching element (18), and a pulse controller (20) for controlling the first and second switching elements in response to gap current (Igap). From a first time (t1) when electric discharge is generated across the machining gap, until a second time (t2) when the gap current reaches the peak current during the ON time, both of the first and second switching elements are on. At the second time (t2) only one of the first and second switching elements is turned off.

2 Claims, 2 Drawing Sheets

(56) References Cited

U.S. PATENT DOCUMENTS

| | | | |
|---|---|---|---|
| 5,111,017 A * | 5/1992 | Futamura et al. | 219/69.18 |
| 5,126,525 A | 6/1992 | Kaneko et al. | 219/69.13 |
| 5,280,153 A * | 1/1994 | Buhler | 219/69.18 |
| 5,374,798 A * | 12/1994 | Kinbara | 219/69.18 |
| 5,386,095 A * | 1/1995 | Kaneko et al. | 219/69.18 |
| 5,539,178 A * | 7/1996 | Taneda et al. | 219/69.13 |
| 5,903,067 A * | 5/1999 | Sato et al. | 219/69.13 |
| 6,392,183 B1 * | 5/2002 | Martin et al. | 219/69.13 |
| 6,465,754 B1 | 10/2002 | Balleys | |
| 6,660,957 B1 * | 12/2003 | Ohguro et al. | 219/69.13 |
| 2006/0054600 A1 | 3/2006 | Satou et al. | |
| 2007/0034609 A1 * | 2/2007 | Murai et al. | 219/69.16 |

FOREIGN PATENT DOCUMENTS

| | | | |
|---|---|---|---|
| JP | 62-287911 | | 12/1987 |
| JP | 62-287911 A | * | 12/1987 |
| JP | 2003-181724 | | 7/2003 |
| JP | 2003-181724 A | * | 7/2003 |

OTHER PUBLICATIONS

"Search Report of European Counterpart Application", issued on Apr. 5, 2013, p. 1-p. 6, in which US6465754, US20060054600, DE4125742, and EP1234630 were cited.

* cited by examiner

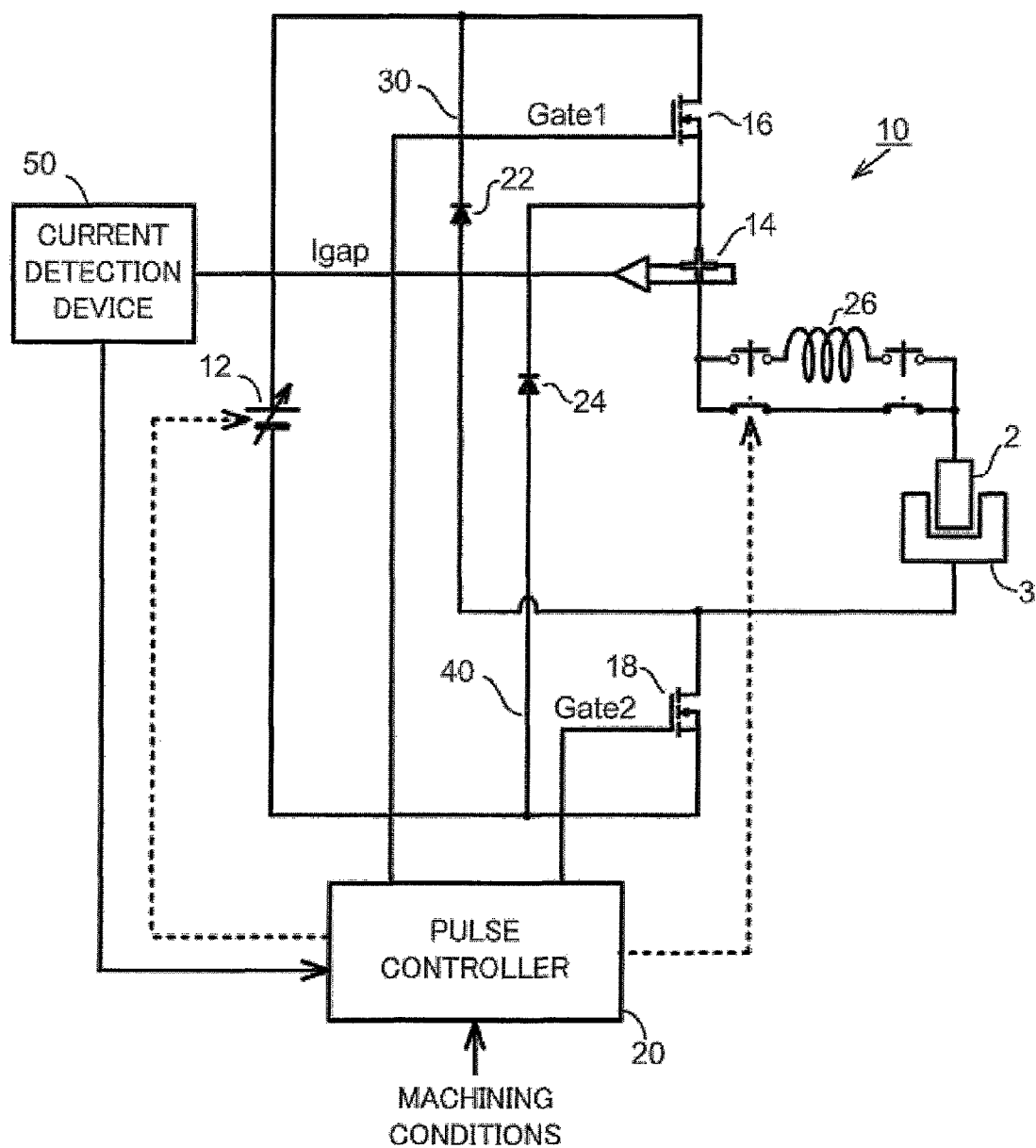

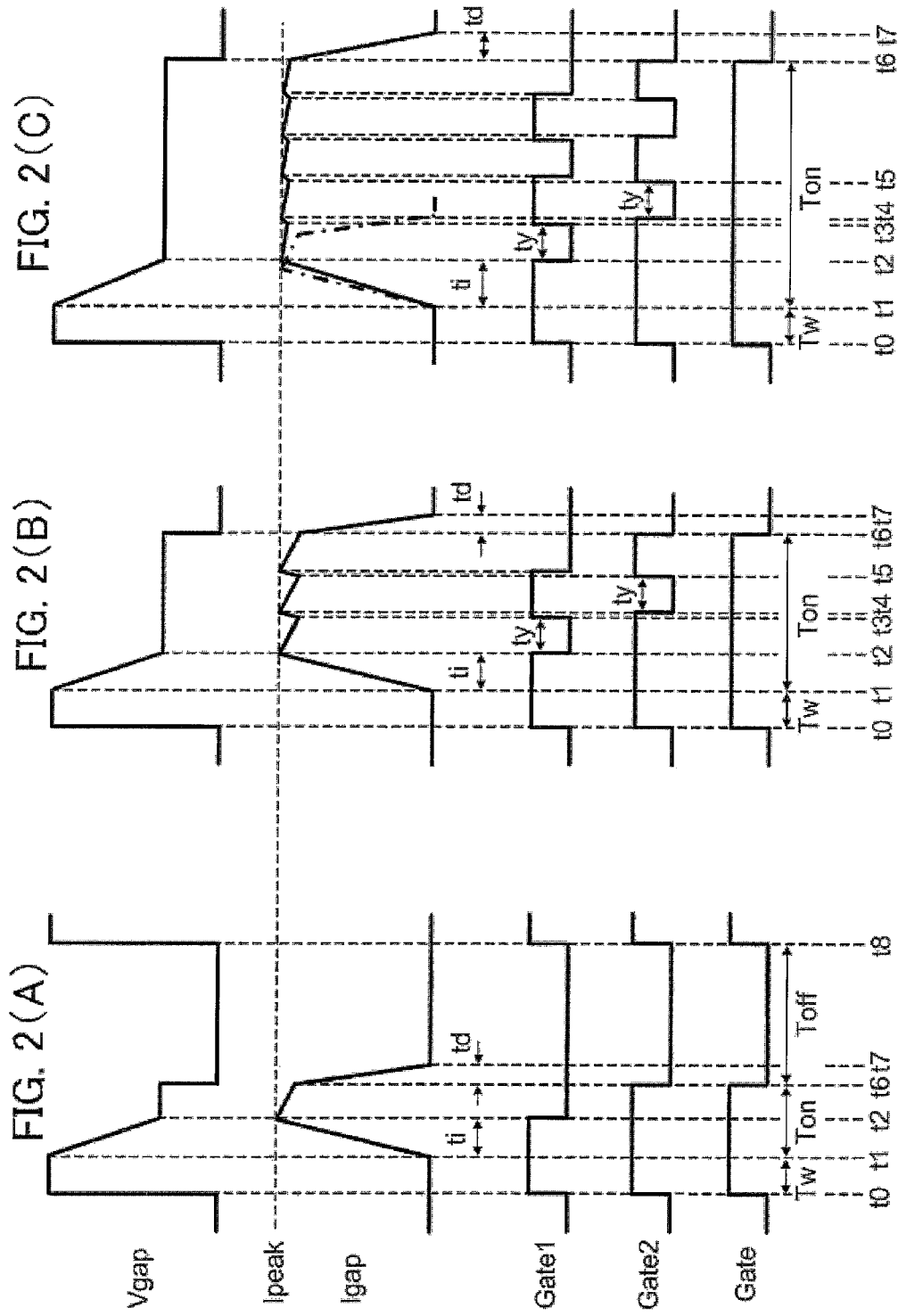

POWER SUPPLY DEVICE FOR SINKER ELECTRIC DISCHARGE MACHINING

CROSS-REFERENCE TO RELATED APPLICATION

This application is a 371 of international application of PCT application serial no. PCT/JP2010/053035, filed on Feb. 26, 2010, which claims the priority benefit of Japan application no. 2009-046989, filed on Feb. 27, 2009. The entirety of each of the above-mentioned patent applications is hereby incorporated by reference herein and made a part of this specification.

BACKGROUND OF THE INVENTION

1. Field of the Invention

The present invention relates to a sinker electric discharge machining device for forming a required cavity, recess or hole, etc. in a workpiece by intermittently causing electrical discharge in a machining gap formed between a tool electrode and a conductive workpiece. In particular, the present invention relates to a power supply device for sinker electric discharge machining, for supplying a sequence of controlled current pulses to the machining gap.

2. Description of the Related Art

Generally, with a sinker electric discharge machining apparatus, a metallic workpiece is located in a tank, and a machining gap is filled with dielectric fluid. If a power supply applies a voltage to the machining gap, the dielectric fluid is ionized. Then, electric discharge is generated across the machining gap and an ON time (alternatively called duration time) starts. During the ON time, discharge current flows through the machining gap, and a small portion of the workpiece material is removed. Once the ON time is completed, the power supply stops application of the current pulse and an OFF time (also called pause time) starts. During the OFF time insulation of the machining gap is restored. Once the OFF time is completed, the power supply again applies a voltage to the machining gap. In this manner electric discharge is repeatedly generated across the machining gap. Sinker electric discharge machining is a process for accurately forming a cavity in a workpiece using electrical discharge while continuously advancing a tool electrode towards the workpiece.

Current pulses having larger energy remove more material from the workpiece. The energy of a current pulse is mainly dependent on the ON time and peak current of the current pulse. Larger energy current pulses improve the material removal rate. On the other hand, smaller energy current pulses are used to improve dimensional precision and surface roughness of a cavity.

Generally, a sinker electric discharge machining process is divided into a plurality of steps of differing current pulse energy. In a first step, namely rough machining, current pulses having large energy are supplied to the machining gap. As the process proceeds to subsequent steps the energy of the current pulses is reduced in a stepwise fashion. In this way dimensional precision of a cavity is improved to a dozen of μm or better. In a final step, or finish machining, surface roughness of the cavity is improved to a dozen of μmRz or better.

A current pulse waveform has an impact on wear of the tool electrode. An ideal waveform for the current pulses differs depending on tool electrode material, workpiece material and the size of a cavity. In the case of machining an iron (Fe) based alloy workpiece using a copper (Cu) tool electrode, current pulses having a long ON time compared to the peak current reduce wear rate. When using such specialized current pulses, the tool electrode is connected to a positive electrode of a dc power supply. Wear rate is usually a rate of wear of the tool electrode (g) with respect to removal of the workpiece (g). Electric discharge machining carried out with a wear rate of 0.1% or less is known as "no wear". Current pulses having a gradual rise time are also known to lower wear rate.

In the case where the specialized current pulses having a long ON time are repeatedly supplied to the machining gap, a sufficiently long OFF time is required in order to restore the insulation of the machining gap. However, if the OFF time becomes longer, the material removal rate is lowered. The desired waveform of the current pulses will differ depending on whether priority is placed on a low wear rate or high material removal rate.

Ordinarily, in cases where a cemented carbide alloy workpiece is machined using a copper tungsten (CuW) tool electrode, a high material removal rate is important, and current pulses having a high peak current are applied to the machining gap at high frequency. A typical cemented carbide is a material having tungsten carbide (WC) powder sintered together with a binding agent of cobalt (Co). In a rough machining step, current pulses having a high peak current of 20 A or more and a short ON time of about 10 μm are supplied to the machining gap. In order to increase the frequency of repeating electric discharge, it is desirable for the rising edge and falling edge of the current pulses to be steep.

U.S. Pat. No. 5,126,525 discloses a power supply device for sinker electric discharge machining in which a current limiting resistor is excluded from an electric discharge machining circuit. Current flowing through a machining gap ("gap current") is interrupted at regular intervals after reaching a set peak current. The gap current is kept substantially constant by this chopping. This type of power supply device can supply current pulses having a steep rising edge, and also does not suffer energy loss due to current limiting resistor. The steep rising edge of the current pulses improves the frequency of the current pulses.

SUMMARY OF THE INVENTION

With the power supply device of U.S. Pat. No. 5,126,525, in order to interrupt the gap current at regular intervals switching elements for supplying current pulses, for example MOSFETs, are turned on and off at high speed. Heat generated by this high speed on/off switching operation reduces the responsiveness of the switching elements, and might also damage the switching elements. The on off switching frequency of the switching elements is therefore restricted. Gap current has a saw-tooth waveform due to the chopping. If the amplitude of the saw-tooth waveform is large, there may be cases where an intended waveform is not formed. For example, the current pulse may fall to zero even though it is during an ON time. In such a case, a specialized current pulse having a long ON time can not realize a low wear rate.

Voltage of a DC power supply is restricted to 45V-60V in order to reduce the amplitude of the saw-tooth wave. If the voltage of the DC power supply is this low, the peak current of the current pulses is also restricted to be low, and improvement in the material removal rate is also restricted. As the time until the gap current reaches peak current is long, improvement of the frequency of the current pulses is also restricted.

In light of the above-described problems, the present invention has as its object to provide a power supply for sinker electric discharge machining that can supply current pulses having a high peak current and a short ON time, and current pulses of small variation in current amplitude, without the use of complicated circuitry.

According to the present invention, a power supply device for sinker electric discharge machining for supplying current pulses to a machining gap formed between a tool electrode (2) and a workpiece (3) comprises a DC power supply (12), a current sensor (14) for detecting gap current (Igap) flowing through the machining gap, a first switching element (16) connected in series between the DC power supply (12) and the tool electrode (2), a first reverse current prevention diode (22) connected in parallel with the DC power supply (12) and connected in series with the machining gap and the first switching element (16), a second switching element (18) connected in series between the DC power supply (12) and the workpiece (3), a second reverse current prevention diode (24) connected in parallel with the DC power supply (12) and connected in series with the machining gap and the second switching element (18), and a pulse controller (20) for controlling the first and second switching elements in response to the gap current (Igap), having ON time (Ton) and peak current (Ipeak). From a first time (t1) when electric discharge is generated across the machining gap, until a second time (t2) when the gap current (Igap) reaches the peak current (Ipeak) during the ON time (Ton), both of the first and second switching elements are on, only one of the first and second switching elements is turned off at the second time (t2), and when the ON time (Ton) is completed both of the first and second switching elements are off.

Preferably, the pulse controller (20) controls the first and second switching elements so that both of the first and second switching elements are on at a third time (t3) when a specified time period (ty) elapses during the ON time (Ton) from the second time (t2).

From the second time (t2) until the third time (t3) the gap current flows in a closed circuit that includes the machining gap, the second switching element (18) and the second reverse current prevention diode (24). Alternatively, from the second time (t2) until the third time (t3) the gap current flows in a closed circuit that includes the machining gap, the first switching element (16) and the first reverse current prevention diode (22).

Preferably, the pulse controller (20) controls the first and second switching elements so that only the other of the first and second switching elements is turned off at a fourth time (t4) when the gap current (Igap) reaches the peak current (Ipeak) during the ON time (Ton) after rising from the third time (t3).

Effects

According to the present invention, switching elements are turned on and off in response to gap current in order to keep peak current constant, which means that there is no need for an electric discharge machining circuit to include a current limiting resistor. Also, both of the first and second switching elements are on from a first time (t1) when electric discharge is generated across the machining gap until a second time (t2) when gap current reaches the peak current. As a result current pulses having a steep rising edge are supplied to the machining gap.

At the second time (t2) only one of the first and second switching elements is turned off, and at a third time (t3) when a specified time period (ty) elapses during the ON time (Ton) from the second time (t2), both of the first and second switching elements are on. From the second time (t2) until the third time (t3), due to an inductance component remaining in the electric discharge machining circuit, the gap current flows in a closed circuit that includes the machining gap, the second switching element (18) and the second reverse current prevention diode (24), or alternatively, in a closed circuit including the machining gap, the first switching element (16) and the first reverse current prevention diode (22). As a result of this, amplitude of a saw-tooth wave becomes small, and it is unlikely that interruption of the current pulses will occur. Also, in the case where amplitude of the saw-tooth wave is small, the voltage of the DC power supply can be made as high as 90 V to a few hundred V. Because of this, current pulses having a large peak current and steep rising edge are provided, and material removal rate is improved.

Only the other of the first and second switching elements is turned off at a fourth time (t4) when the gap current (Igap) reaches the peak current (Ipeak) during the ON time (Ton) after rising from the third time (t3). As a result, a chopping frequency can be made higher than the switching frequency of the first and second switching elements, for example, 500 kHz-1 MHz.

BRIEF DESCRIPTION OF THE DRAWINGS

FIG. 1 is a circuit diagram showing a power supply device of the present invention.

FIGS. 2(A)~2(C) are timing charts showing operation of a pulse controller of FIG. 1.

DESCRIPTION OF PREFERRED EMBODIMENTS

A first embodiment of a power supply device for sinker electric discharge machining of the present invention will be described with reference to FIG. 1. The power supply device for sinker electric discharge machining comprises an electric discharge machining circuit 10, a pulse controller 20, and a current detection device 50. The electric discharge machining circuit 10, includes a machining gap formed between a tool electrode 2 and a workpiece 3. The electric discharge machining circuit 10, comprises a DC power supply 12, a current sensor 14, a first switching element 16 and a second switching element 18. A current limiting resistor is not included in the electric discharge machining circuit 10, and resistance is minimized. A positive pole of the DC power supply 12 is connected to the tool electrode 2, while a negative pole of the DC power supply 12 is connected to the workpiece 3.

The current sensor 14 is provided at a position in the vicinity of the machining gap, for detecting current flowing through the machining gap (Igap). The current sensor 14 is comprised of a hall element type current sensor, and is provided in series with the machining gap and the first switching element 16. A hall element type current sensor substantially applies no resistance element to the electric discharge machining circuit 10. As a result, if a hall element type current sensor is used instead of a voltage detector having a detection resistor, current pulses will have a steep rising edge. The current detection device 50 holds the maximum value of the gap current Igap and converts it to a voltage signal by means of a filter. A detected current signal of the current detection device 50 is subjected to analog to digital conversion and provided to the pulse controller 20.

The first switching element 16 is connected in series between the DC power supply 12 and the tool electrode 2. The second switching element 18 is connected in series between the DC power supply 12 and the workpiece 3. The first and second switching elements 16 and 18 may be respectively comprised of a plurality of switching elements connected in parallel.

The electric discharge machining circuit 10 has a first bypass circuit 30 and a second bypass circuit 40. The first bypass circuit 30 is connected in parallel with the DC power supply 12 and in series with the machining gap and the first switching element 16. A reverse current prevention diode 22 for preventing current from the positive pole of the DC power supply 12 and the tool electrode 2 is provided in the first bypass circuit 30. The second bypass circuit 40 is connected in parallel with the DC power supply 12 and in series with the machining gap and the second switching element 18. A reverse current prevention diode 24 for preventing current from the positive pole of the DC power supply 12 and the tool electrode 2 is provided in the second bypass circuit 40.

The pulse controller 20 controls on/off switching operations of the first and second switching elements 16 and 18. An NC device (not shown in the drawings) supplies signals representing setting of machining conditions to the pulse controller 20. Machining conditions are, for example, peak current Ipeak, ON time Ton, OFF time Toff, and power supply voltage and polarity. The pulse controller 20 generates a gate signal Gate in accordance with the ON time and the OFF time.

The pulse controller 20 generates a first gate signal Gate1 and a second gate signal Gate2 in accordance with the gate signal Gate, a current detection signal, peak current Ipeak and a specified time period ty. The first gate signal Gate1 is applied to a gate electrode of the first switching element 16, and the second gate signal Gate2 is applied to the gate electrode of the second switching element 18.

The pulse controller 20 turns both of the first and second switching elements 16 and 18 on in order to apply a voltage on the machining gap. The machining gap is normally filled with dielectric fluid. Dielectric fluid is ionized by the application of voltage. As a result, electric discharge is generated and current flows through the machining gap. A time period during which voltage is being applied on the machining gap but electric discharge is not generated is called a no-load time. The no-load time is a time period that cannot be accurately predicted.

On time is a specified time period starting from occurrence of electric discharge. The pulse controller 20 maintains the on state of both of the first and second switching elements 16 and 18 during a period of the rising edge of a current pulse in the ON time. The pulse controller 20 compares the detected current Igap to the peak current Ipeak. The pulse controller 20 stops only one of the first gate signal Gate1 and second gate signal Gate2 when the detected current Igap is greater than or equal to the peak current Ipeak. Once the ON time is completed, the pulse controller 20 turns both of the first and second switching elements 16 and 18 off. Off time is a specified time period starting from completion of the ON time.

The pulse controller 20 selects power supply voltage of the DC power supply 12 based on machining conditions, and controls a polarity switching circuit (not shown). Further, the pulse controller 20 inserts an inductance element 26 into the electric discharge machining circuit 10 or takes the inductance element 26 out of the electric discharge machining circuit 10.

Operation of the pulse controller 20 will be described with reference to FIG. 2(A) to FIG. 2(C). Vgap in the drawings represents voltage across the machining gap, and Igap represents current flowing through the machining gap. Tw represents the no-load time, Ton represents the ON time, and Toff represents the OFF time. In order to simplify the drawings, only a single electric discharge is generated in each of the timing charts of FIG. 2(A) to FIG. 2(C).

FIG. 2(A) shows a current pulse having an ON time Ton that is extremely short, specifically about 0.1 μs-4 μs. The pulse controller 20 takes the inductance element 26 out of the electric discharge machining circuit 10. Output voltage of the DC power supply 12 is set high, to between about 90V and a few hundred V.

At time t0, the pulse controller 20 turns on the gate signal Gate. Together with the gate signal Gate, the first and second gate signals Gate1 and Gate2 are turned on. In this way, the first and second switching elements 16 and 18 are turned on, and power supply voltage of the DC power supply 12 is applied on the machining gap.

At time t1 when the no-load time Tw has elapsed from time t0, electric discharge is generated across the machining gap and the ON time Ton starts. At time t1, the gap voltage Vgap falls and the gap current Igap rises. Current is supplied from the DC power supply 12 through the first switching element 16 to the machining gap, and is returned to the DC power supply 12 through the second switching element 18. The pulse controller 20 maintains the on state of the first and second gate signals Gate1 and Gate2 during the time period ti where the gap current Igap forms the rising edge of the current pulse. Since a current limiting resistor is not contained in the electric discharge machining circuit 10 and the output voltage of the DC power supply 12 is high, the rising edge of the current pulse is steep and the period ti is short.

At time t2 when the gap current Igap reaches the peak current Ipeak, the pulse controller 20 turns off the first gate signal Gate1 and maintains the on state of the second gate signal Gate2. In this way the first switching element 16 is turned off, and the second switching element 18 remains on. As a result, the gap current Igap is gradually reduced compared to the rising edge of the current pulse. At time t6 when the ON time Ton is completed, the pulse controller 20 turns off the gate signal Gate. In the period from time t2 to time t6, the gap current Igap flows in a closed circuit including the machining gap, the second switching element 18 and the reverse current prevention diode 24, because of the inductance component remaining in the electric discharge machining circuit 10.

The OFF time Toff commences at time t6. Together with the gate signal Gate, the second gate signal Gate2 is turned off. In this way the second switching element 18 is turned off. As a result, the gap current Igap is reduced abruptly. At time t7 when the time period td, in which the gap current Igap forms the falling edge of the current pulse, is completed, the gap current Igap becomes zero. During the time period td, the gap current Igap flows in a closed circuit made up of the machining gap, the first bypass circuit 30, the DC power supply 12 and the second bypass circuit 40. At time t8 when the OFF time Toff is completed, the pulse controller 20 again turns on the gate signal Gate. Together with the gate signal Gate, the first and second gate signals Gate1 and Gate2 are turned on.

In FIG. 2(B), a current pulse is shown with high material removal rate given priority, suitable for machining of a cemented carbide workpiece using a copper tungsten tool electrode. Times that are the same as in FIG. 2(A) are assigned the same reference numerals, and their descriptions will be omitted. A current pulse has a peak current Ipeak of 20 A or more, and an ON time Ton of between a few μs and a dozen of μs. The pulse controller 20 takes the inductance element 26 out of the electric discharge machining circuit 10. Output voltage of the DC power supply 12 is set high, to between about 90V and a few hundred V.

At time t2 when the gap current Igap has reached the peak current Ipeak, the pulse controller 20 turns off the first gate signal Gate1 and maintains the on state of the second gate signal Gate2. At this time, a specified time period ty set in the pulse controller 20 commences. The specified time period ty is shorter than the ON time Ton, for example, 1 µs to a few µs. At time t3 when the specified time period ty is completed, the pulse controller 20 turns on the first gate signal Gate1. As a result, the first and second switching elements 16 and 18 are both turned on, and the gap current Igap rises abruptly. In the period from time t2 to time t3, current flows in a closed circuit including the machining gap, the second switching element 18 and the reverse current prevention diode 24, because of the inductance component remaining in the electric discharge machining circuit 10. The period from time t3 to time t4 when the gap current Igap reaches the peak current Ipeak again is extremely short.

At time t4, the pulse controller 20 maintains the on state of the first gate signal Gate1, and turns off the second gate signal Gate2. At this time, the specified time period ty is started again a second time. At time t5 when the second occurrence of the specified time period ty is completed, the pulse controller 20 turns on the first second gate signal Gate2. In the period from time t4 to time t5, current flows in a closed circuit including the machining gap, the first switching element 16 and the reverse current prevention diode 22, because of the inductance component remaining in the electric discharge machining circuit 10.

FIG. 2(C) shows a current pulse with low wear rate prioritized, suitable for machining a steel workpiece using a steel tool electrode. Times that are the same as in FIG. 2(A) and FIG. 2(B) are assigned the same reference numerals, and their descriptions will be omitted. Chain lines in the drawing represent the current pulse in FIG. 2(A). A current pulse has a peak current Ipeak of 15 A or more, and an ON time Ton of 50 µs or longer. The pulse controller 20 inserts an inductance element 26 of 5µH-30 µH in the electric discharge machining circuit 10.

The effect of the inductance element 26 is that the rising edge of the current pulse in the time period ti is gentler than the current pulse in FIG. 2(A). Also, the amplitude of the saw-tooth waveform from time t2 to time t6 less than the amplitude of the saw-tooth waveform of FIG. 2(B). Further, the falling edge of the current pulse in time period td is gentler that the current pulse shown by the chain line. This type of current pulse is suitable for "zero wear" machining.

It is not intended that the present invention be limited to the disclosed forms. Various modifications are clearly possible with reference to the above description. For example, it is possible for the pulse controller 20 to turn the second gate signal Gate2 off and maintain the on state of the first gate signal Gate1 at time t2, and to turn the first gate signal Gate1 off and maintain the on state of the second gate signal Gate2 at time t4.

The invention claimed is:

1. A power supply device for sinker electric discharge machining for supplying current pulses to a machining gap formed between a tool electrode and a workpiece comprising:
   a DC power supply;
   a current sensor for detecting gap current flowing through the machining gap;
   a first switching element connected in series between the DC power supply and the tool electrode;
   a first reverse current prevention diode connected in parallel with the DC power supply and connected in series with the machining gap and the first switching element;
   a second switching element connected in series between the DC power supply and the workpiece;
   a second reverse current prevention diode connected in parallel with the DC power supply and connected in series with the machining gap and the second switching element; and
   a pulse controller for controlling the first and second switching elements in response to the gap current, the pulse controller having ON time and peak current;
   wherein from a first time when electric discharge is generated across the machining gap, until a second time when the gap current reaches the peak current during the ON time, both of the first and second switching elements are on;
   wherein only one of the first and second switching elements is turned off at the second time;
   wherein both of the first and second switching elements are on at a third time when a specified time period elapses during the ON time from the second time;
   wherein only the other of the first and second switching elements is turned off at a fourth time when the gap current reaches the peak current during the ON time after rising from the third time; and
   wherein when the ON time is completed both of the first and second switching elements are off.

2. The power supply device for sinker electric discharge machining of claim 1, wherein from the second time until the third time the gap current flows in a first closed circuit that includes the machining gap, the first switching element and the first reverse current prevention diode or in a second closed circuit that includes the machining gap, the second switching element and the second reverse current prevention diode.

* * * * *